Figure 1:
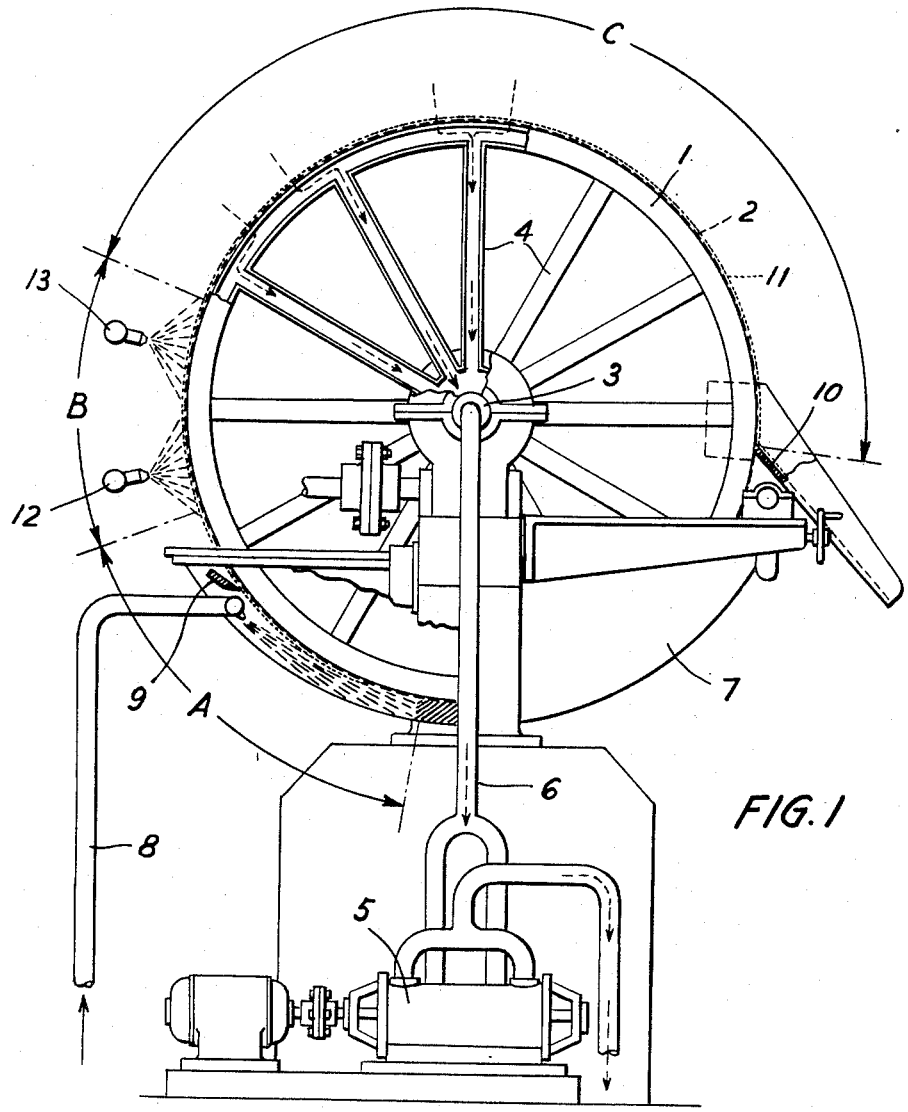
Figure 2:
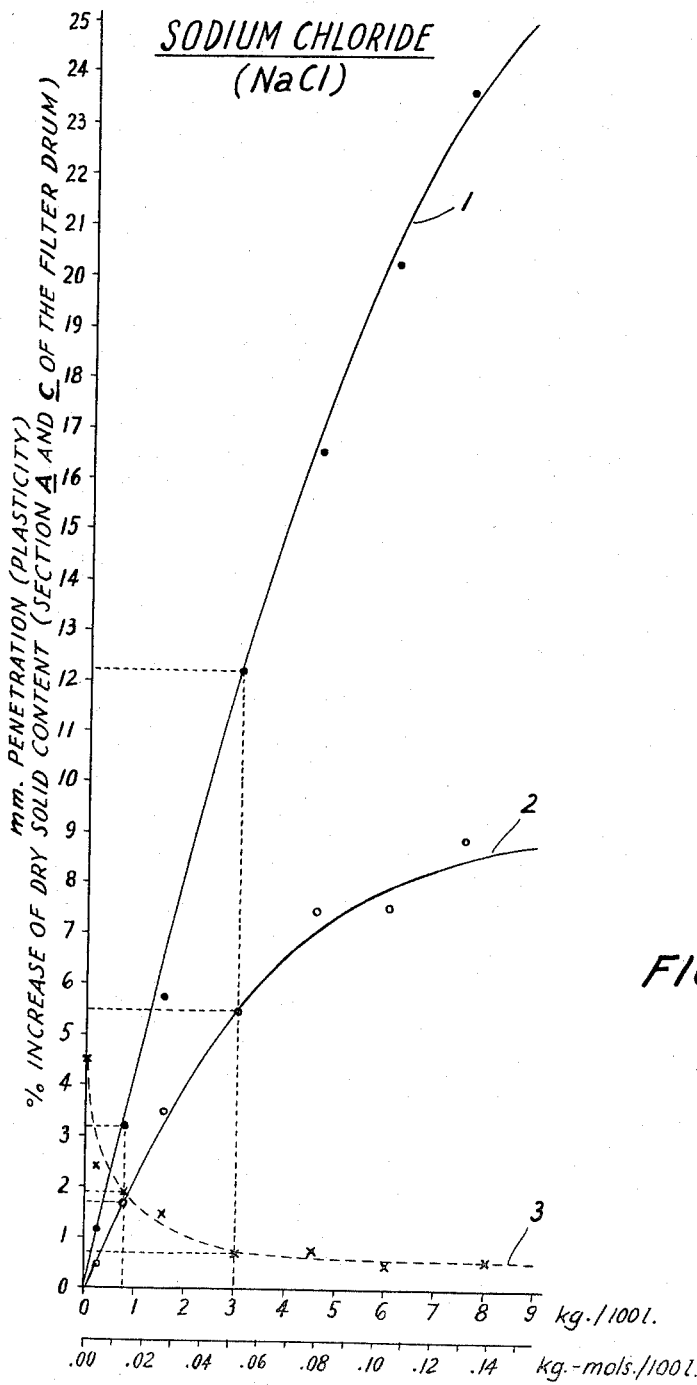
Figure 3:
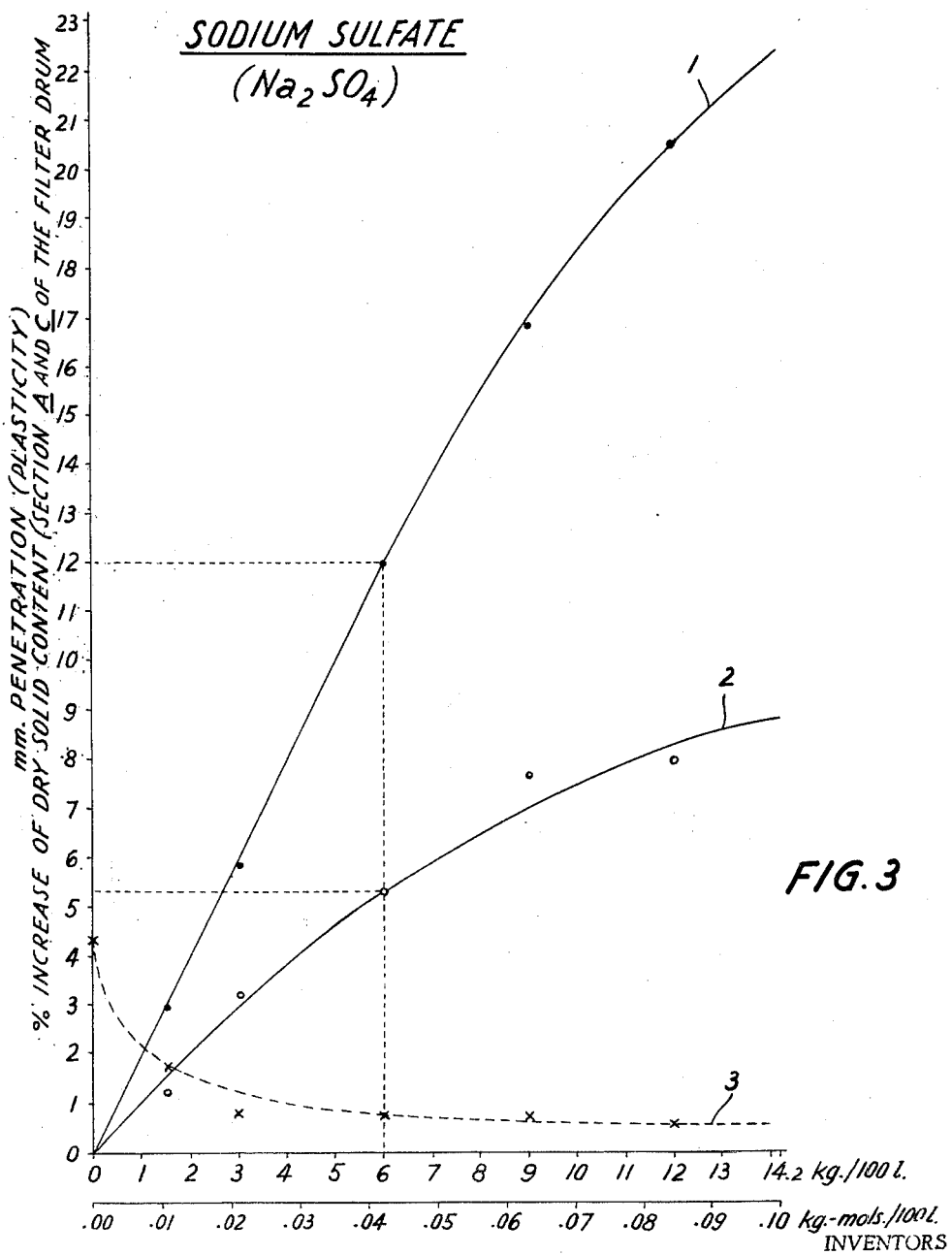
Figure 4:
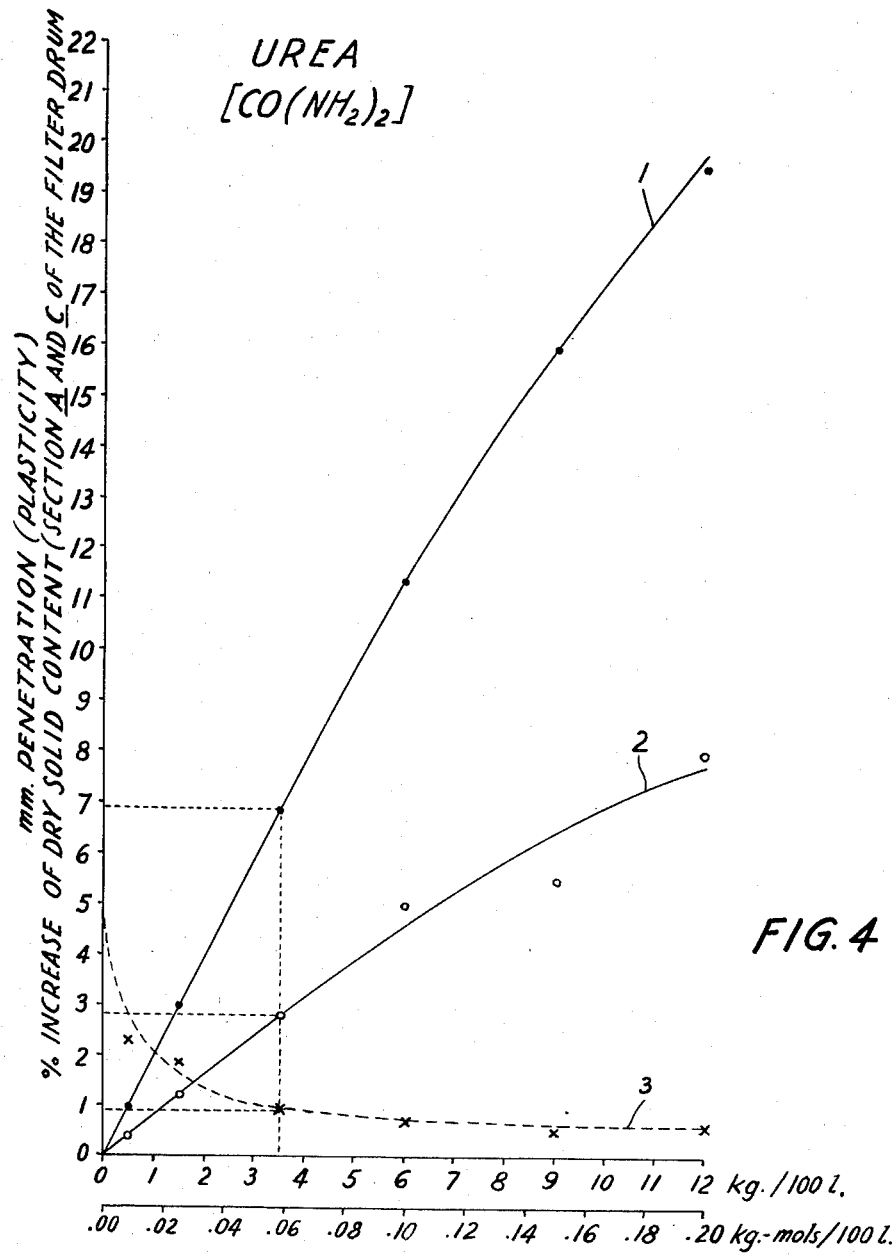
Figure 5:
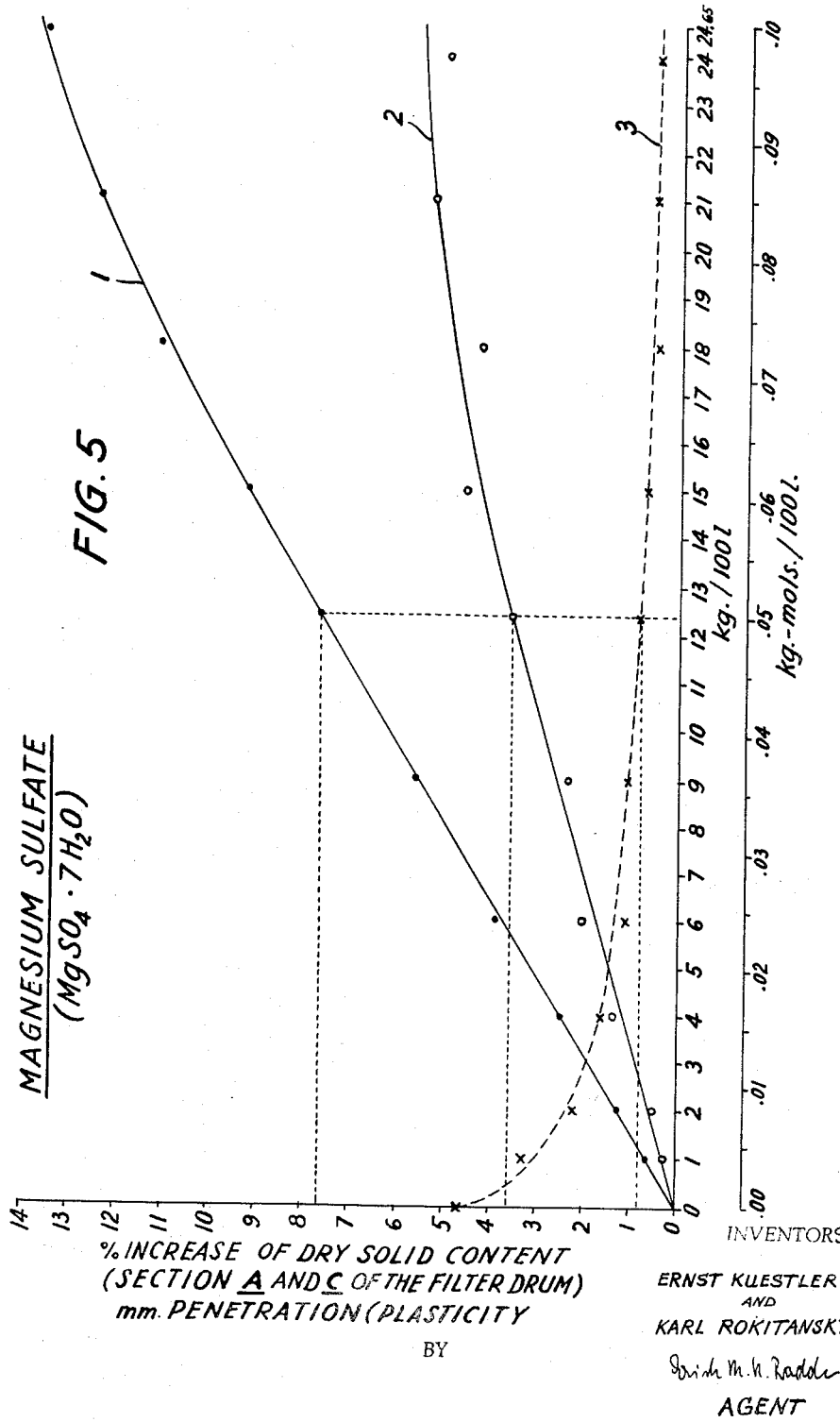
Figure 6:
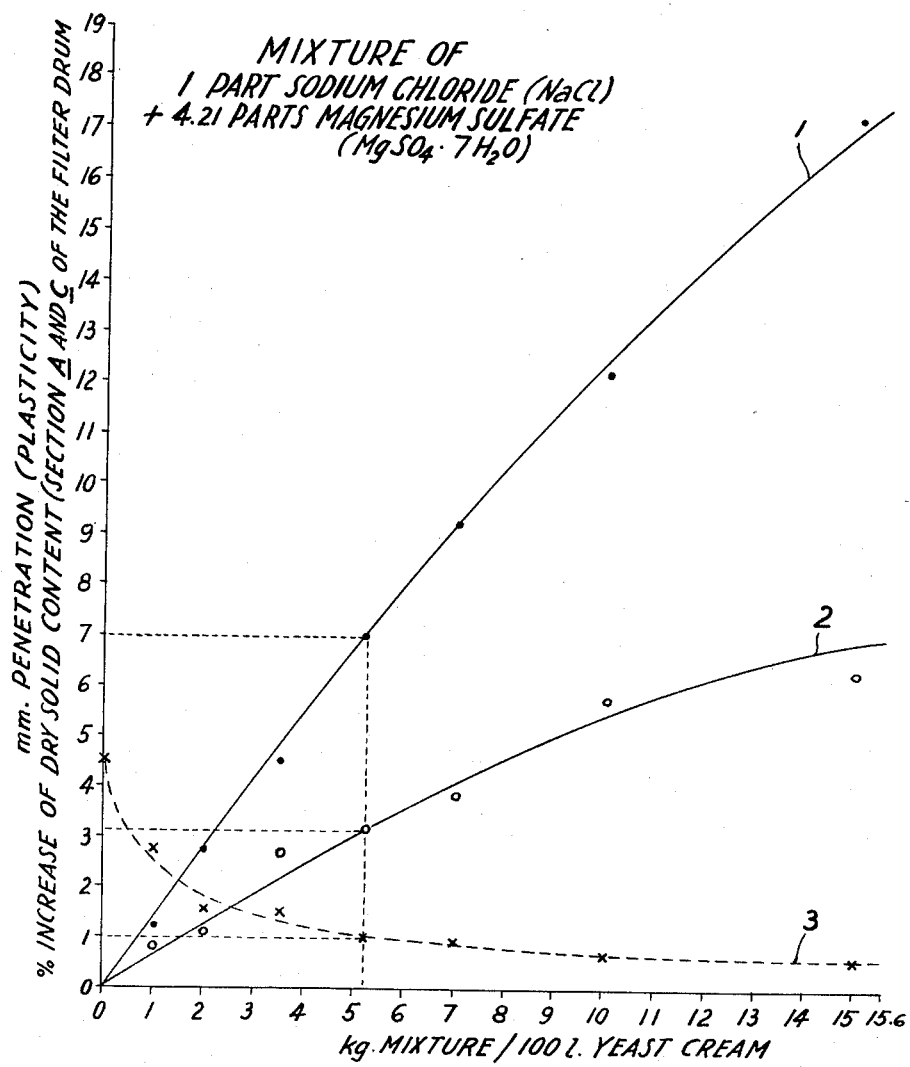

United States Patent Office 2,947,668
Patented Aug. 2, 1960

2,947,668
PROCESS OF PRODUCING YEAST OF INCREASED DRY SOLID CONTENT AND REDUCED PLASTICITY

Ernst Kuestler, Mauer, Vienna, and Karl Rokitansky, Vienna, Austria, assignors to Vereinigte Mautner Markhof'sche Press-Hefe Fabriken, Vienna, Austria, a corporation of Austria Filed Jan. 16, 1959, Ser. No. 787,242

Claims priority, application Austria Feb. 3, 1954

13 Claims. (Cl. 195—98)

The present invention relates to a process of producing dried yeast and more particularly to a process of producing yeast of an increased dry solid content and reduced plasticity by means of suction filters.

The present application is in part a continuation of our copending application Serial No. 485,572, filed February 1, 1955, now abandoned, and entitled "Process of Producing Yeast and Similar Vegetable Cell Material."

As a rule, yeast suspensions, also called yeast cream, as obtained in the yeast industry, are dehydrated by passing such suspensions through filter presses under a comparatively high pressure (3 to 12 atmospheres gauge). Thereby a sufficiently dry and, thus, marketable product is obtained in a reliable manner. Such a mode of procedure, however, has the disadvantage that it can be carried out in batch operation only. The dehydrated yeast removed from the filter press is usually too dry to permit proper shaping and molding. Therefore, a further working step, namely moistening with water is required before such shaping or molding operation. Furthermore, when forcing yeast suspensions through filter presses, it is quite difficult to determine and adjust in a quick and reliable manner and with sufficient uniformity and accuracy the dry solid content of the pressed yeast and its plasticity.

In spite of all these disadvantages of the process of recovering yeast by means of filter presses, the process of dehydrating yeast by means of suction filters and especially by means of rotary filters which types of filters permit continuous operation, yield a more uniform product, and require a smaller operating crew than when using filter presses, has been made use of in the yeast industry to a limited extent only. The reason therefor is that the pressure which can be applied to suction filters is much lower, namely below one atmosphere and that, therefore, the resulting yeast has a very high water content or, respectively, too low a dry solid content, namely, as an average, a dry solid content of only about 27.5%. Such a yeast can be marketed under favorable climatic conditions only. Yeast recovered from suction filters loses its water content quite rapidly and, therefore, soon becomes unsightly. The shaped or molded yeast bricks show considerable amounts of moisture oozing out therefrom and, due thereto, softening and wrinkling of the wrapping paper and the cardboard boxes in which the yeast is packed.

According to another known process, the dry solid content of yeast is increased by adding to the yeast suspension, before filtration, osmotically active compounds such as, for instance, sugar, sodium chloride, sodium sulfate, calcium chloride, or the like. Addition of such osmotically active compounds increases the osmotic pressure of the water surrounding the yeast cells. As a result thereof, cell water exudes from the yeast cells until the same osmotic pressure prevails inside the cells and in the yeast water surrounding said cells and having added thereto osmotically active compounds. The yeast suspension produced in this manner and having a reduced water content in the yeast cells is then separated in a manner known per se from most of the yeast water surrounding said yeast cells. The resulting yeast with an increased dry solid content, however, contains outside of the yeast cells the same quantity of water as a yeast which has not been treated with osmotically active compounds as described above. The amount of water surrounding the yeast cells is merely dependent upon the conditions of pressure or, respectively, upon the difference in pressure which prevail on removing the yeast water by means of a filter press or a suction filter, respectively. Since the various properties which are characteristic for yeast, such as degree of dehydration, feel, plasticity, are merely dependent on the amount of water surrounding the yeast cells, it is evident that the same unfavorable properties of plasticity and dryness are achieved thereby as when proceeding according to the conventional processes of dehydration which do not make use of osmotic effects. Yeast which has been produced in this manner has the disadvantage over yeast that has not been so pretreated, that it contains osmotically active compounds in the yeast water surrounding the pressed yeast cells. As a result thereof such a yeast is only of limited usefulness.

It is one object of the present invention to provide a simple and effective process of dehydrating a yeast suspension by means of suction filters of any type, i.e., in continuous operation, thereby producing a yeast which is free of the above mentioned disadvantages and which is distinguished by its increased content of solid matter as well as by its improved, i.e., reduced plasticity.

Another object of the present invention is to provide a yeast of improved stability and keeping quality and of better leavening power than heretofore possible.

Other objects of the present invention and advantageous features thereof will become apparent as the description proceeds.

The process according to the present invention can be carried out by means of all types of suction filters, for instance, by means of vacuum band filters, band cell filters and the like. The most suitable filters for carrying out this process are vacuum drum filters and especially the rotary suction filters developed by Rosenquist, and similar vacuum drum filters.

The process according to the present invention is based on the following considerations: Important factors with respect to the properties of yeast separated and recovered from a yeast suspension are, above all, its content of extracellular water, its content of intracellular water, and the combined total thereof, i.e., the total water content of the recovered yeast. By "extracellular water" is understood that amount of water which is found outside the yeast cells. In the case of a yeast suspension, said extracellular water is the water or, respectively, the dilute wort solution wherein the yeast cells swim. In the case of filter pressed or suction filtered and subsequently shaped and molded yeast, said extracellular water is that amount of water which is present in the narrow capillary interstices formed by the more or less tightly accumbent cells. The feel of yeast is dependent upon the amount of extracellular water present therein. Consequently, the amount of extracellular water determines whether the yeast or the shaped yeast bricks and the like made therefrom have a moist, sticky, dry, smooth, velvety, or the like feel. Furthermore, the plasticity of yeast is also dependent upon its content of extracellular water.

The "intracellular water" of yeast is that amount of water which is present within the yeast cells. The amount of intracellular water can be varied as explained hereinbefore, by subjecting the yeast cells to the action of osmotically active solutions. When placing yeast cells into a solution the osmotic pressure of which is higher than the osmotic pressure of their cell juice, water or liquid, respectively, exudes from the interior of the cells into the solution wherein the cells are suspended. This phenomenon is called "cytorrhysis" or cell contraction (see S. Windisch and C. Enders in "Die Brauwelt" 1946, pages 151 to 220). The dry solid content of cells subjected to such a cytorrhysis increases. When displacing the solution having an osmotic pressure higher than the osmotic pressure of the original cell juice by a solution the osmotic pressure of which is lower than that of the cell juice, for instance, by water, then the water present in such a solution re-enters the cells. Exudation of water from yeast cells as well as re-entry of water into yeast cells, both caused by osmosis, are processes which are time-dependent, i.e., which require for their completion a definite period of time. While the amount of extracellular water is of determinative importance with respect to feel and plasticity of the shaped yeast bricks and the like, the amount of the intracellular water, in contrast hereto, has substantially no effect upon said properties. Thus, it was found that yeast bricks made of strongly cytorrhyzed cells as they can be obtained by adding osmotically active compounds to yeast cream, in spite of their often rather high dry solid content of 33% of solid yeast matter and even more, have just the same moist feel as yeast bricks composed of only slightly or not at all cytorrhyzed cells containing only about 27.5% of solid yeast matter. It is understood, of course, that in such comparative tests the same yeast cream was used and the same pressure was employed for dehydration. That these two types of yeast dehydrated by different methods have the same feel and plasticity, is due to the fact that the content of extracellular water which is responsible for said feel and plasticity and which is dependent only upon the difference in pressure employed on filtration, is the same and that merely the content of intracellular water varies. In yeast cells subjected to cytorrhysis, said content of intracellular water is considerably smaller than in not cytorrhyzed yeast cells. The total water content which is the sum of extracellular water and intracellular water, in case of yeast bricks consisting of cytorrhyzed cells, thus, is correspondingly smaller than in case of yeast bricks consisting of non-cytorrhyzed cells.

The process according to the present invention for the production of yeast with increased dry solid content by means of suction filters and preferably by means of rotary drum vacuum filters in continuous operation, consists, in principle, in adding osmotically active compounds to the aqueous suspension of the cell mass, for instance, to yeast cream whereby said osmotically active compounds cause exudation of intracellular water from the cells, and thereafter filtering the suspension of yeast cells cytorrhyzed by such a treatment through the suction filter. The layer of cytorrhyzed cell material formed on the suction filter is then treated with a liquid of lower osmotic pressure, preferably with water to displace the extracellular water containing the osmotically active compounds, the amount of said extracellular water in filtered cell mass being dependent upon the difference in pressure of the suction filter. Said displacement of extracellular water containing osmotically active compounds is regulated in such a manner that it is completed before reabsorption of water by the cells, in the form of intracellular water, is completed, and that the layer of cell material freed in this manner from osmotically active compounds is subsequently subjected on the suction filter to the action of the difference in pressure. During said subsequent filtering step extracellular water is absorbed by the cells and enters the cells as intracellular water with the result that the content of extracellular water is decreased below the value resulting from the difference in pressure. After the amount of extracellular water in the yeast layer, subsequently to the washing process, has been readjusted according to the difference in pressure, the content of intracellular water in the cells is increased at the expense of the extracellular water present in the interstices between said cells, while the total water content remains the same.

While, heretofore, the amount of extracellular water of a yeast layer deposited by suction on a suction filter and, due thereto, feel and plasticity of said layer are mainly affected by the difference in pressure applied on filtering, it is possible, by means of the process according to the present invention, to control, regulate, and adjust the content of intracellular water and of extracellular water in the yeast removed from the filter. This surprising result is achieved by making use of progressively proceeding, deliberately controlled osmotic processes.

Dehydration of a yeast suspension by the process according to the present invention will be described more in detail and a working example will be given hereinafter without, however, limiting the invention thereto.

First, an osmotically active compound, such as sodium chloride is added to the yeast cream so that the osmotic pressure of the extracellular water becomes higher than the osmotic pressure of the juice in the yeast cells. Due to said difference in osmotic pressure, aqueous liquid exudes from the yeast cells. The suspension is allowed to remain in contact until exudation of water according to the difference in osmotic pressure is substantially completed. This requires only a few seconds for the main part of exudation, in total a few minutes. The thus pretreated yeast cream is then fed to the filtering device, such as a rotary vacuum filter or the like. Thereby, a yeast layer is formed which layer has a definite content of extracellular water dependent upon the filtering conditions and a very specific feel dependent upon said content of extracellular water. The capillary interstices within said yeast layer are filled with osmotically highly active extracellular water the amount of which corresponds to the difference in pressure applied to the rotary filter. Thereafter the yeast layer is washed, as briefly as possible, with water, preferably with tap water, the osmotic pressure of which is lower than the osmotic pressure of the yeast cell juice. By said washing step, the osmotically highly active liquid present in the capillaries of the yeast layer is displaced by an osmotically less active liquid. Thereby, instantly, water commences to reenter the yeast cells and such reentry of water continues until the osmotic pressure of the intracellular water of said yeast cells has been adjusted so that it corresponds to the osmotic pressure of the washing agent, i.e., of water. The first step, displacement of the osmotically highly active solution by washing and simultaneously the readjustment of the amount of extracellular water of the yeast layer to the value, which corresponds to the acting difference in pressure, as well as the second step, re-entry of water into the cells, require a definite period of time.

It is an essential feature of the process according to the present invention, to regulate said displacement of osmotically highly active extracellular water by osmotically less highly active extracellular water in such a manner that it is completed before reabsorption of water by the yeast cells is completed. Said reabsorption starts instantly on contact with the wash water used for displacing the osmotically active water containing sodium chloride. This effect can readily be achieved by regulating the intensity of the washing treatment according to the thickness of the yeast layer deposited upon the filter and by properly limiting the duration of said washing step. Optimum conditions for each batch of yeast and yeast suspension can be determined without difficulty by a few preliminary tests. As soon as the filter carrying the yeast layer is moved out of the washing zone, for instance, when using a drum or rotary filter by rotating the drum away from the washing zone, the extracellular water is partly removed by suction due to the difference in pressure caused by the vacuum applied to the filter which pressure difference continues to act upon said layer, and is partly absorbed by the yeast cells. In this manner the amount of extracellular water is further diminished due to its absorption, in the form of intracellular water, by the yeast cells.

It is a particularly essential feature of the present process that displacement of the extracellular water containing osmotically active compounds by a liquid with lower osmotic pressure, such as water, is carried out within a shorter period of time than would be required for complete absorption of water by yeast cells. The time required for displacing extracellular water containing osmotically active compounds is measured in seconds and amounts, in many cases, to 0.5 second to 1.5 seconds depending only upon the thickness of the yeast layer. Washing is preferably carried out in a comparatively narrow zone of the filter area or, respectively, the drum circumference. If reabsorption of water by re-cytorrhysis were completed during the displacement step, i.e., during washing of the yeast layer, i.e., if the washing time were extended as long as required for complete re-cytorrhysis by the yeast cells, the yeast cells, as soon as said displacement were completed, would have lost their capacity to absorb extracellular water. In this case the final product still would contain such an amount of extracellular water as corresponds to the difference in pressure applied to the filter. Consequently, the desired result of decreasing the content of extracellular water and of the total water content would not be achieved. Therefore, care must be taken that the yeast when subjected to the process according to the present invention is able to replenish its loss in intracellular water due to the previous treatment with osmotically active compounds, not only from the wash water but also by absorbing as much as possible of the extracellular water present in the yeast in an amount corresponding to the difference in pressure. As a result of such a procedure, feel and plasticity will be considerably improved. Thus, by the continuous mode of operation according to the present invention a yeast corresponding in almost every respect to the yeast quality resulting on using filter presses conventionally employed in the yeast industry, is obtained although filtration of the yeast cream is effected by means of suction filters.

It is possible, by using the process according to the present invention, to produce yeast of a dry solid content between 29% and 33% and even of a still higher dry solid content, for instance, of 37.5% and higher. The dry solid content may even be higher than that of yeast filtered under high pressure by means of a filter press. Proper adjustment of the type and amount of osmotically active compound and proper regulation of the washing treatment, consequently, enables predetermined adjustment of feel, plasticity, and dry solid content of yeast to any desired value within a wide range of such values.

The process according to the present invention has proved to be primarily of value in the recovery of yeast from aqueous yeast suspensions, particularly in the production of compressed yeast. The process can, however, also be used for the separation and recovery of other types of yeast, such as brewer's yeast, yeast of a high fat content, and the like.

Due to the properties mentioned in the following under items (a)–(i) sodium chloride is the preferred osmotically active compound. It is, of course, understood that other osmotically active electrolytes, for instance, alkali metal sulfates, such as Glauber's salt, i.e., sodium sulfate decahydrate, potassium sulfate, ammonium sulfate, alkali metal and alkaline earth metal chlorides and nitrates, such as potassium chloride, calcium chloride, calcium nitrate, alkali metal carbonates, such as sodium carbonate, alkali metal phosphates, such as mono-potassium phosphate, ammonium phosphate, readily water soluble aluminium salts such as aluminum nitrate, readily water soluble alkali metal salts of organic acids such as sodium acetate, potassium sodium tartrate, and other water soluble salts and mixtures thereof. Especially suitable are all water soluble salts which contain sodium, potassium, ammonium, calcium, magnesium and aluminum ions. Non-electrolytes such as water soluble mono- and polyhydric primary, secondary and tertiary alcohols and especially ethylene glycol and glycerol, readily water soluble organic nitrogen compounds, such as urea, readily water soluble carbohydrates not fermentable by the yeast actually subjected to the process according to the invention such as trioses, tetroses, pentoses and hexoses, mono-, di- and trisaccharides or other water soluble compounds can also be used to bring about cytorrhysis of the cells according to the present invention. All salts and organic compounds must have the following properties:

(a) They must be readily soluble in water at a temperature between about 5° C. and about 25° C.

(b) They must not chemically react and must not form precipitates with the substances dissolved in the water or, respectively, in the extracellular water of the yeast cream.

(c) They must not damage or otherwise detrimentally affect the yeast cells in the concentrations in which they are employed.

(d) They must not chemically react or physiologically affect the cell membrane so as to impede or otherwise affect removal of said osmotically active agents from the yeast cells by washing with and replacement by fresh water.

(e) They must be substantially non-toxic for humans and must be substantially free of pharmacological effects in the concentrations in which they are employed.

(f) They should be colorless in aqueous solution.

(g) They should not have an intrinsic odor.

(h) They should be free of sanitary objections.

(i) Their price should be low enough to render the process according to the present invention economical.

The amounts of these osmotically active electrolytes and non-electrolytes to be added in this process may vary considerably depending upon the type of yeast to be treated and the osmotically active agent employed. The optimum amounts can readily be determined in each case and for each yeast cream by simple preliminary tests. In general there are added between about 0.001 kg.-moles and about 0.1 kg.-moles of electrolyte and between about 0.002 kg.-moles and about 0.2 kg.-moles of non-electrolyte to 100 l. of yeast cream in order to achieve the desired result.

Fig. 1 of the attached drawings serves to illustrate a vacuum rotary drum filter as it is advantageously used in carrying out the process according to the present invention, while Figs. 2 to 10 illustrate the efficacy of the osmotically active compound upon the dry solid content and the plasticity of the yeast cream and the interdependence of said three factors.

The following examples serve to illustrate the process according to the present invention without, however, being limited thereto.

EXAMPLE 1

To separate yeast from yeast cream treated as will be described in detail hereinafter, a vacuum rotary drum filter of known construction is used, for instance, a filter as illustrated diagrammatically in Fig. 1 of the attached drawings. Such a filter comprises double-walled drum 1, the outer wall of which is perforated and is covered by filter cloth 2. Drum 1 is rotatably arranged around hollow shaft 3 which is connected with the walls of said drum by hollow spokes 4. A vacuum is produced in said drum by means of vacuum pump 5 which is connected with hollow shaft 3 by suction pipe 6. The lower part of drum 1 passes, on rotation of said drum, through trough 7. Yeast cream is introduced into said trough 7 from the storage tank (not shown) through pressure pipe 8. Stripper 9 is provided to control the thickness of yeast layer 11 formed on drum 1. Scraper blade 10 removes said yeast layer 11 from the filter. Furthermore, spraying nozzles 12 and 13 are provided at one side of drum 1, said nozzles 12 and 13 spraying, with a predetermined amount of water, freshly formed yeast layer 11 when said layer passes through the washing area formed by a limited part of the drum circumference. The area where formation of yeast layer 11 from the yeast cream introduced into trough 7 takes place, is indicated in Fig. 1 by section A while the area where freshly formed yeast layer 11 is sprayed with wash water is indicated by section B and this filtering area by section C.

The diameter of filter drum 1 used in the present experiment is 2,000 mm., its width 1,250 mm., and the entire filter area is 7.23 sq. m. The effective difference in pressure is about 710 mm. Hg corresponding to about 0.93 atm.

10,000 l. of yeast cream containing about 18 kg. of yeast solids per 100 liters of yeast cream are mixed in the storage tank, while stirring, with 500 l. of a solution containing 78.8 kg. of sodium chloride (addition I). 10,500 l. of yeast cream containing 0.75% of sodium chloride (78.8 kg.) are obtained thereby (product II). Due to said salt addition water rapidly exudes from the cells and cytorrhysis is completed within a few minutes. The cytorrhysed yeast cream can directly and continuously be fed to trough 7 of the rotary filter through pipe 8. It is, however, also possible to keep and store the cytorrhyzed yeast cream for several days, for instance, for 3 to 4 days. Preferably the yeast cream is supplied to said trough 7 of the filter at a temperature of 14–16° C. Filter drum 1 is caused to rotate with a speed of 8 revolutions per minute. Thereby, yeast layer 11 is formed in section A of said filter drum 1. Stripper 9 adjusts the thickness of layer 11 to about 0.3 mm. Said yeast layer 11 initially consists of completely cytorrhyzed yeast cells and extracellular water containing sodium chloride (product III). Although a sample of said initial yeast layer has a low water content, namely, in the present example, a dry solid content of 31.0% (dry solid content of product III), it has a completely moist feel because its extracellular water content corresponds to the difference in pressure acting on the rotary filter, i.e., in the present case, to about 0.93 atm., while its intracellular water content is low.

Rotation of drum 1 continuously carries yeast layer 11 into the area of section B of said drum. In said area the layer is sprayed with water discharged from nozzles 12 and 13. The sprayed area amounts to 0.77 sq. m. corresponding to about 11% of the entire filter area. 480 l. of water per hour are sprayed upon yeast layer 11 corresponding to 0.5 l. per kg. yeast of a dry solid content of 29.5%. Yeast layer 11 remains in said section B where it is sprayed with water for only 0.8–1.0 second. During said spraying with water, recytorrhysis takes place, i.e., reabsorption of water by the cells whereby their osmotic equilibrium is disturbed. Part of the sprayed water is absorbed by the yeast cells. However, reabsorption of water is not completed before yeast layer 11 which is now salt-free, due to rotation of filter drum 1 arrives at section C. On further rotation of drum 1, layer 11 passes through and remains in filtering section C for about 3.2 seconds and is removed from the filter surface by scraper blade 10. The stripped and filtered yeast is then fed to the shaping or molding machine (not shown). In section C water is removed from the capillary spaces of filter cake 11 until the content of extracellular water is readjusted to the amount corresponding to the prevailing difference in pressure. As soon as such adjustment has taken place, no further variation in the total water content of yeast layer 11 and, thus, no further variation in its dry solid content is possible. In the present example the total dry solid content amounts to 29.5% (dry solid content of product IV). However, during this filtering period movement of water within the yeast layer takes place since, due to progressive recytorrhysis, further amounts of water are absorbed by the yeast cells. Consequently, the intracellular water content of the yeast cells increases while the extracellular water content of the yeast layer and the plasticity which is dependent thereon, decrease. Even when the yeast is stripped from the drum filter by means of scraper blade 10, absorption of said extracellular water by the yeast cells continues. This becomes apparent when removing yeast immediately after it has been stripped from the rotary filter by means of scraper blade 10 and kneading such yeast by hand; for, thereby the yeast appears to become drier and its plasticity is reduced accordingly. This effect is to be attributed to the continuing absorption effect whereby extracellular water is absorbed by the yeast cells and their intracellular water content is increased accordingly. For instance, when taking a sample 5 minutes after the yeast has been stripped from the filter by scraper blade 10, said yeast, treated according to the present invention, shows a dry solid content of 29.5% (dry solid content of product IV) and a plasticity corresponding to a depth of penetration of 1.80 mm. (plasticity of product IV) caused by applying thereto an indentor body for 2 minutes. In order to be able to properly evaluate the improvement in yeast quality achieved by the process according to the present invention, especially with respect to its increase in dry solid content and to its plasticity, the same yeast cream is treated on the same rotary drum filter under exactly the same conditions but without salt addition. The yeast obtained thereby had a dry solid content of only 27.8% (product V). The plasticity of such a yeast sample corresponds to a depth of penetration of 4.50 mm. (plasticity of product V) when tested by the same test method as the treated sample. It follows that the increase in dry solid content achieved in this example amounts to 29.5−27.8= 1.7% (increase in dry solid content of product IV) and the decrease in plasticity to 4.50−1.80=2.70 mm. (decrease in plasticity of product IV).

Yeast produced according to the present invention by adding salt to yeast cream and subsequently washing such treated and filtered yeast, feels considerably drier than yeast obtained from untreated yeast cream. This is due to the increase in dry solid content in combination with the decrease in extracellular water achieved by the treatment according to the present invention.

The increase in the dry solid content of yeast as given above, represents a comparative figure obtained when working up the same yeast cream without addition of sodium chloride (control experiment) or, respectively, with addition of sodium chloride under otherwise like conditions and especially by supplying to both yeast layers 11 the same amount of wash water in section B of the rotary drum filter. This increase in dry solid content amounting, according to the given example, to 1.7% when adding 0.75 kg. of sodium chloride per 100 l. of a specific yeast cream, is, of course, dependent upon the amount of sodium chloride or other osmotically active compound added to the yeast cream.

The following table represents a brief description of the use of further osmotically active electrolytes and non-electrolytes in the process according to the present invention. The procedure in all these examples is substantially the same as that followed in Example 1. The table shows (a) The salts and non-electrolytes added in place of sodium chloride used in Example 1, (b) The molecular weight of said osmotically active compounds, (c) The amounts of osmotically active agent calculated in kg.-moles per 100 l. of yeast cream and (d) In kg. per 100 l. of yeast cream (product II), (e) The dry solid content of a sample taken from section A of the filter drum (dry solid content of product III), (f) The increase, in percent, of dry solid content of said product III, compared with the dry solid content of yeast to which no osmotically active agent was added (product V), (g) The dry solid content of product IV taken from section C of the filter drum, i.e., after recytorrhysis, (h) The increase, in percent, of dry solid content of said product IV, compared with the dry solid content of yeast to which no osmotically active agent was added (product V), (i) The plasticity of product IV measured in mm. penetration, (j) The decrease in plasticity of product IV measured in mm. decrease of penetration, compared with the plasticity of product V, (k) As comparative data there are given the dry solid content of yeast taken from section C of the filter drum without addition of osmotically active agents to the initial yeast cream (product V), and (l) The plasticity of such a yeast measured in mm. penetration (product V).

With respect to these data it is pointed out that, although the dry solid matter content of yeast to which an osmotically active agent has been added, is quite high when leaving section A of the filter drum, the plasticity of such a yeast is as high as that of the samples listed in column $l$, i.e., because only its intracellular water content is reduced but not its extracellular water content.

Column $f$ indicates the difference in dry solid content of a yeast sample leaving section A of the filter drum before washing in comparison with a yeast sample leaving said section A but to which no osmotically active agent had been added. For instance, the dry solid content of the yeast treated according to Example 2 is 40.0% (column $e$) while the dry solid content of yeast which had not been treated with an osmotically active agent is 27.8% (column $k$). Thus, the difference between these values, i.e, 40.0%—27.8% is 12.2% as given in column $f$.

Likewise, the difference in dry solid content of treated and washed yeast on leaving section C of the filter drum (column $g$) in comparison with untreated yeast (column $k$) is given in column $h$. For instance, in Example 2 this difference is 33.3% (column $g$)—27.8% (column $k$)=5.5% (column $h$).

Table

| Example No. | Osmotically active agent used | Molecular weight | Addition of osmotically active agent | | Treated but unwashed yeast from section A of the filter drum | | Washed yeast according to the present invention from section C of the filter drum | | | | Comparative figures: yeast from section C of the filter drum obtained without addition of osmotically active agent | |
|---|---|---|---|---|---|---|---|---|---|---|---|---|
| | | | in kg., moles per 100 l. of yeast cream | in kg. per 100 l. of yeast cream | Percent dry solid content | Percent increase in dry solid content | Percent dry solid content | Percent increase in dry solid content | mm. penetration | mm. decrease of penetration (decrease of plasticity) | Percent dry solid content | mm. penetration (plasticity) |
| | a | b | c | d | e | f | g | h | i | j | k | l |
| 1 | sodium chloride NaCl | 58.5 | 0.013 | 0.75 | 31.0 | 3.2 | 29.5 | 1.7 | 1.80 | 2.70 | 27.8 | 4.50 |
| 2 | sodium chloride NaCl | 58.5 | 0.051 | 3.0 | 40.0 | 12.2 | 33.3 | 5.5 | 0.70 | 3.80 | 27.8 | 4.50 |
| 3 | sodium sulfate $Na_2SO_4$ | 142.1 | 0.042 | 6.0 | 40.8 | 12.0 | 34.1 | 5.3 | 0.80 | 3.50 | 28.8 | 4.30 |
| 4 | sodium acetate $CH_3.COONa.3H_2O$ | 136.1 | 0.011 | 1.5 | 30.5 | 2.9 | 28.9 | 1.3 | 1.80 | 2.80 | 27.6 | 4.60 |
| 5 | sodium carbonate $Na_2CO_3$ | 106.0 | 0.006 | 0.6 | 29.0 | 1.4 | 28.4 | 0.8 | 2.40 | 2.20 | 27.6 | 4.60 |
| 6 | potassium chloride KCl | 74.6 | 0.090 | 6.7 | 47.1 | 18.1 | 36.4 | 7.4 | 0.65 | 3.85 | 29.0 | 4.50 |
| 7 | ammonium sulfate $(NH_4)_2SO_4$ | 132.2 | 0.030 | 3.9 | 36.7 | 7.7 | 32.4 | 3.4 | 1.00 | 3.50 | 29.0 | 4.50 |
| 8 | ammonium phosphate $(NH_4)_2HPO_4$ | 132.1 | 0.006 | 0.8 | 29.4 | 1.3 | 28.7 | 0.6 | 2.60 | 2.00 | 28.1 | 4.60 |
| 9 | calcium chloride $CaCl_2.2H_2O$ | 147.0 | 0.061 | 9.0 | 46.1 | 18.9 | 34.7 | 7.5 | 0.65 | 4.00 | 27.2 | 4.65 |
| 10 | urea $CO(NH_2)_2$ | 60.1 | 0.058 | 3.5 | 35.5 | 6.9 | 31.4 | 2.8 | 0.90 | 3.80 | 28.6 | 4.70 |
| 11 | glycol $CH_2OH.CH_2OH$ | 62.1 | 0.020 | 1.2 | 30.7 | 1.4 | 29.9 | 0.6 | 1.85 | 2.90 | 29.3 | 4.75 |
| 12 | potassium phosphate $KH_2PO_4$ | 136.2 | 0.030 | 4.1 | 33.9 | 6.0 | 30.7 | 2.8 | 1.20 | 3.25 | 27.9 | 4.45 |
| 13 | glycerol $CH_2OH.CHOH.CH_2OH$ | 92.1 | 0.050 | 4.6 | 35.1 | 6.6 | 31.3 | 2.8 | 1.00 | 3.70 | 28.5 | 4.70 |
| 14 | magnesium sulfate $MgSO_4.7H_2O$ | 246.5 | 0.050 | 12.3 | 36.8 | 7.7 | 32.7 | 3.6 | 0.85 | 3.75 | 29.1 | 4.60 |
| 15 | calcium nitrate $Ca(NO_3)_2.4H_2O$ | 236.1 | 0.064 | 15.0 | 44.2 | 17.4 | 33.9 | 7.1 | 0.65 | 3.70 | 26.8 | 4.35 |
| 16 | potassium sodium tartrate $KOOC.CHOH.CHOH.COONa.4H_2O$ | 282.2 | 0.035 | 10.0 | 40.1 | 11.5 | 33.4 | 4.8 | 0.75 | 4.05 | 28.6 | 4.80 |
| 17 | aluminum nitrate $Al(NO_3)_3.9H_2O$ | 375.2 | 0.007 | 2.5 | 31.5 | 2.5 | 30.1 | 1.1 | 1.85 | 2.75 | 29.0 | 4.60 |
| 18 | mixture of salts $NaCl+MgSO_4.7H_2O$ | 152.5 | 0.034 | 5.21 | 35.7 | 7.0 | 31.9 | 3.2 | 1.00 | 3.50 | 28.7 | 4.50 |

The difference in plasticity achieved by proceeding according to the present invention (column *j*) is calculated from the values given in column *i* for treated yeast on leaving section C of the filter drum and the values given in column *l* for untreated yeast. For instance, in Example 2 this difference in plasticity is 4.50 (column *l*)−0.70 (column *i*)=3.80 (column *j*). The yeast resulting from the treatment with osmotically active agents, thus, has not only a higher dry solid content but also a considerably reduced plasticity due to its lower extracellular water content.

Figs. 2 to 6 of the attached drawings illustrate the effect of sodium chloride (Fig. 2), sodium sulfate (Fig. 3), urea (Fig. 4), magnesium sulfate (Fig. 5) and of a mixture of sodium chloride and magnesium sulfate (Fig. 6) used as osmotically active agent and added to the yeast cream as described in Examples 1, 2, 3, 10 and 18. In said Figs. 2 to 6 is shown the effect of amount of the salts or of the salt mixture upon the increase in dry solid content and the decrease in plasticity and the interdependence of said three factors. Thereby the lines 1 (measured values marked with a point) indicate the relation between salt or salt mixture addition and dry solid content. In said Figs. 2 to 6 the values corresponding to the amount of salt or salt mixture are laid off in kg. of salt or salt mixture per 100 l. of yeast cream as abscissa along the uniformly graduated horizontal axis while the increase in percent of the dry solid content of yeast re-removal from the filter from sections A and C respectively is laid off on the ordinate. Full lines are then drawn through corresponding points plotted according to middle value data obtained by corresponding experiments, whereby curves 1 in Figs. 2 to 6 represent the percent increase of dry solid content from samples of the section A of the filter drum while curves 2 in Figs. 2 to 6 (measured values marked with a circle) represent the percent increase of dry solid content from sample of the section C of the filter drum.

The broken line curves 3 in Figs. 2 to 6 (measured values marked with a cross) illustrated the relation between the plasticity of a shaped or molded yeast brick and the addition of said salts or of the salt mixture to yeast cream and their interdependence. The values corresponding to the amount of salt or salt mixture added are also laid off in kg. of salt or salt mixture per 100 l. of yeast cream on the abscissa, while plasticity values are laid off on the ordinate. Said plasticity values are obtained by means of a known plasticity measuring apparatus by determining, after a period of 2 minutes, the depth of penetration of an indentator weight of 162.6 g. into yeast bricks shaped and molded under always the same conditions.

It is evident that, when proceeding according to the present invention, an increase in the dry solid content of the resulting yeast always corresponds to a decrease in plasticity. Experiments with other types of yeast cream of different manufacture have shown that the values upon which said curves are based, are only slightly scattered. Therefore, the relationships indicated by said curves apply, in general, to all yeast creams.

The above given Examples 1 to 18 comprise osmotically active agents of different composition and, thus, show that the process according to the present invention can be carried out with various osmotically active compounds, both electrolytes and non-electrolytes whereby always the same result is achieved namely an increase in dry solid content and a decrease in plasticity.

The examples given show that the osmotically active agents can be grouped in the following groups:

(*a*) Electrolytes which dissociate in aqueous solution into 2 ions, such as sodium chloride, potassium chloride, sodium acetate, magnesium sulfate.

(*b*) Electrolytes which dissociate in aqueous solution into 3 ions, such as sodium carbonate, sodium sulfate, calcium nitrate, calcium chloride, ammonium sulfate, potassium sodium tartrate.

(*c*) Electrolytes which dissociate in aqueous solution into 4 ions, such as aluminum nitrate.

(*d*) Electrolytes of indeterminate dissociation in aqueous solution, such as mono-potassium phosphate, diammonium phosphate.

(*e*) Mixtures of such electrolytes, such as mixtures of sodium chloride and magnesium sulfate.

(*f*) Non-electrolytes, such as urea, glycerol, ethylene glycol.

When quantitatively comparing the results of the tests as given in the above table, it is clearly evident that varying amounts of the osmotically active agents must be employed in order to obtain the same values with respect to increase in dry solid content and decrease in plasticity under otherwise the same conditions with respect to the filter drum, such as number of revolutions, vacuum, composition of the yeast cream, and the like.

For instance, in order to increase the dry solid content of the treated yeast by 2% and to decrease the plasticity to a value corresponding to a depth of penetration of the indentator of about 1.45 mm., the following amounts of osmotically active agents are to be added to each 100 l. of yeast cream:

0.9 kg. of sodium chloride,
2.0 kg. of sodium sulfate,
2.5 kg. of urea, or
6.7 kg. of magnesium sulfate.

Figure 7A:
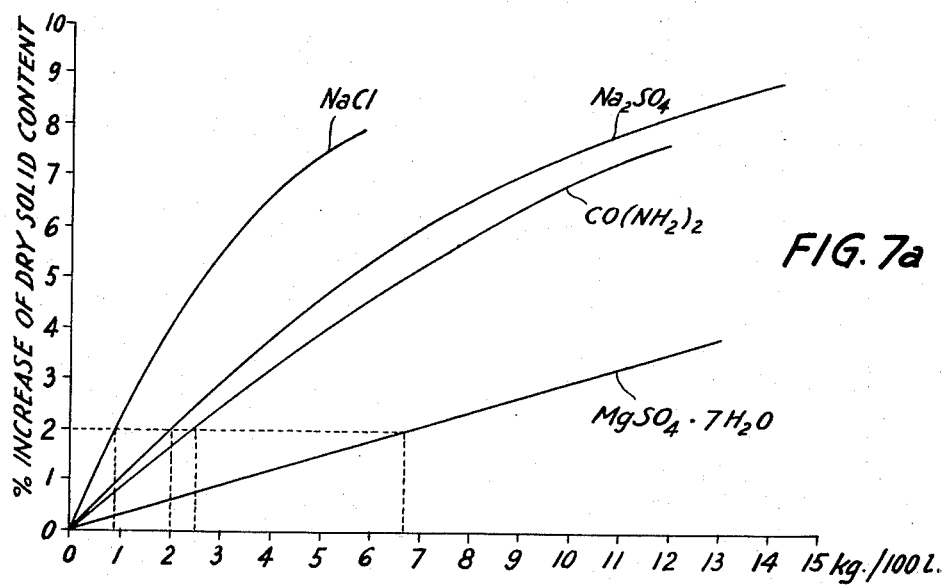
Figure 7B:
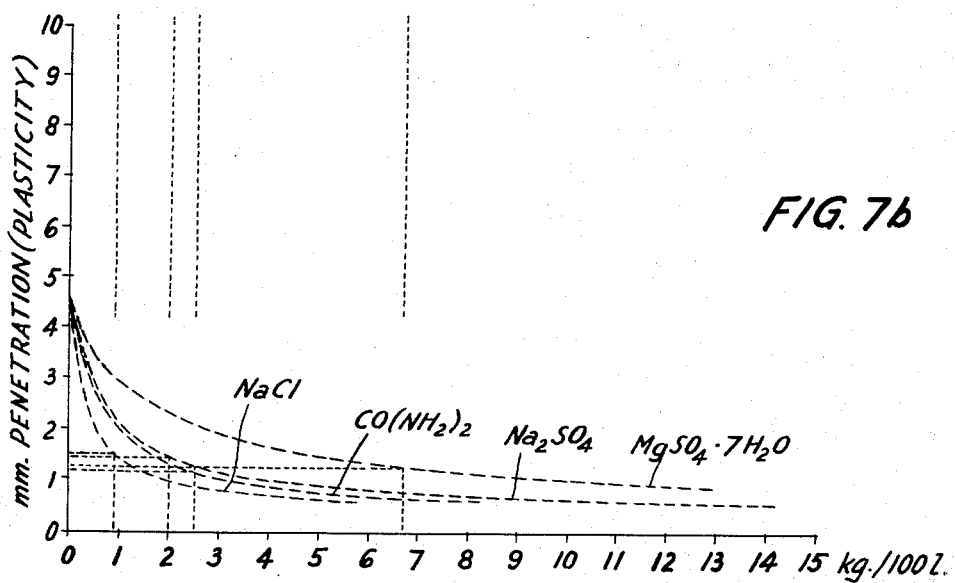

These data can readily be calculated from the curves given in Fig. 7*a* which show the relation between the amount of osmotically active agent in kg./100 l. of yeast cream and the percent increase in dry solid content and Fig. 7*b* which shows the relation between the amount of osmotically active agent in kg./100 l. of yeast cream and the plasticity measured in mm. penetration.

The results obtained in experiments 1 to 18 as given in the preceding table permit to establish a simple quantitative rule whereby the osmotically effective agents are classified in various groups when taking into consideration not the absolute amounts added to the yeast cream (kg./100 l.) but the molar amounts (kg.-moles/100 l.). According to said classification the non-electrolytes have an efficacy 1 when compared with the following compounds, the compounds dissociating into 2 ions have the efficacy 2, and the compounds dissociating into 3 or more ions have the efficacy 3.

This means that of the compound having the efficacy 2, only about half the amount, calculated in kg.-values, of the compound having the activity 1, i.e., a non-electrolyte must be admixed to the yeast cream in order to achieve the same increase in dry solid content under otherwise the same reaction conditions.

Fig. 8 and 9*a* to 9*c* illustrate the curves which show that this rule is approximately correct. More or less apparent deviations are primarily due to the influence of the content of water of crystallization in the various salts which has a diluting effect when dissolving the salts in the yeast cream, or respectively, to the conditions of dissociation which are partly dependent on the prevailing pH-value of the solution.

Figure 8:
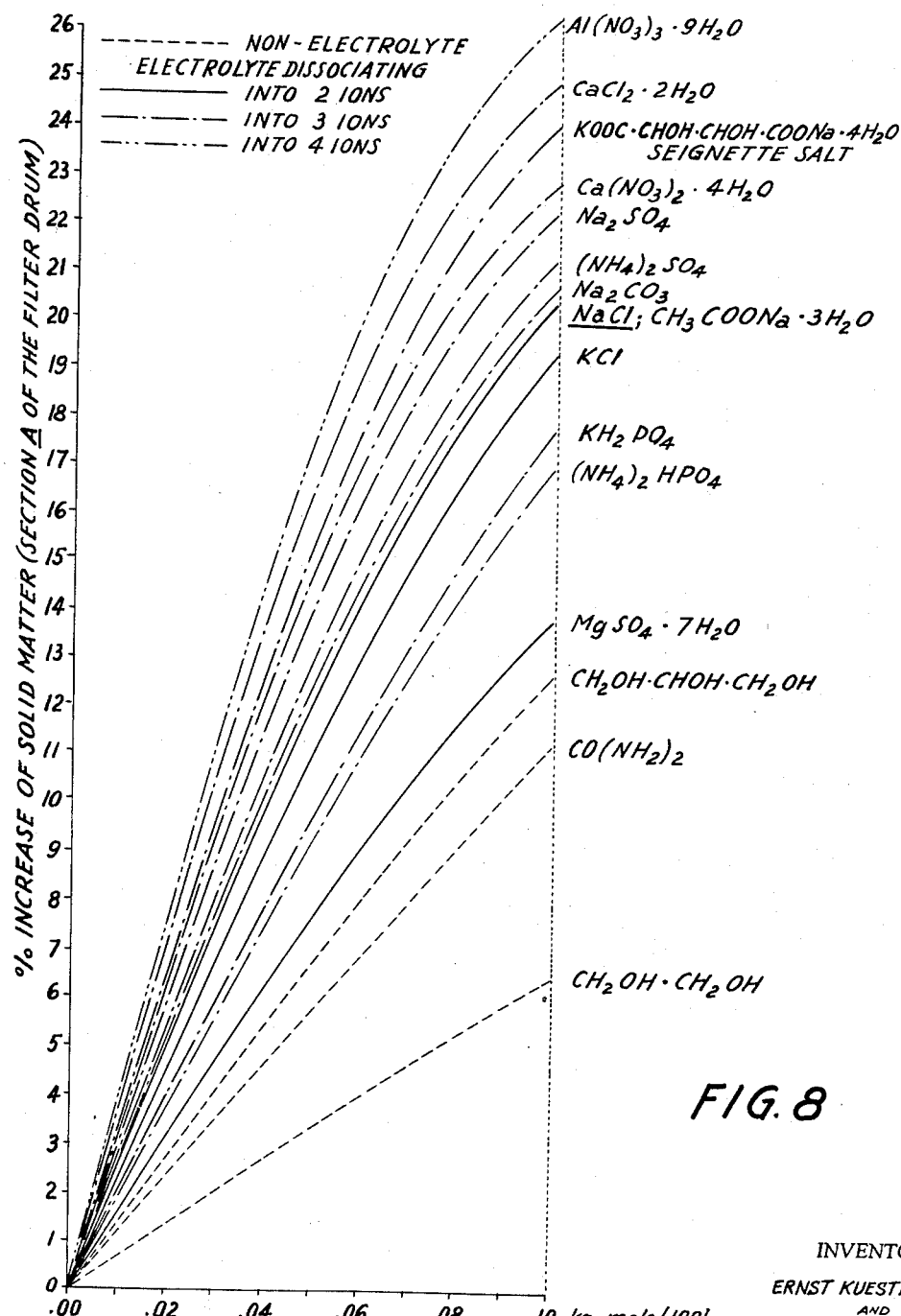
Figure 9A:
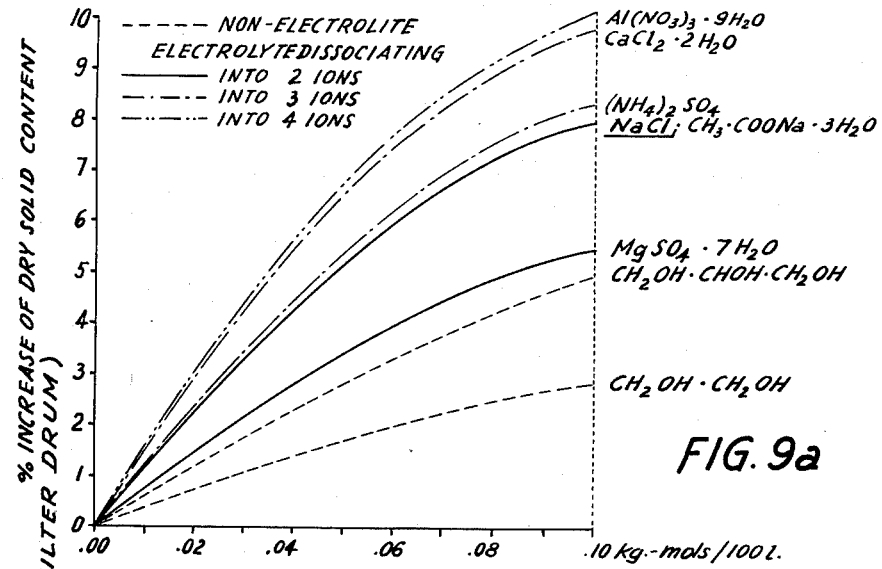
Figure 9B:
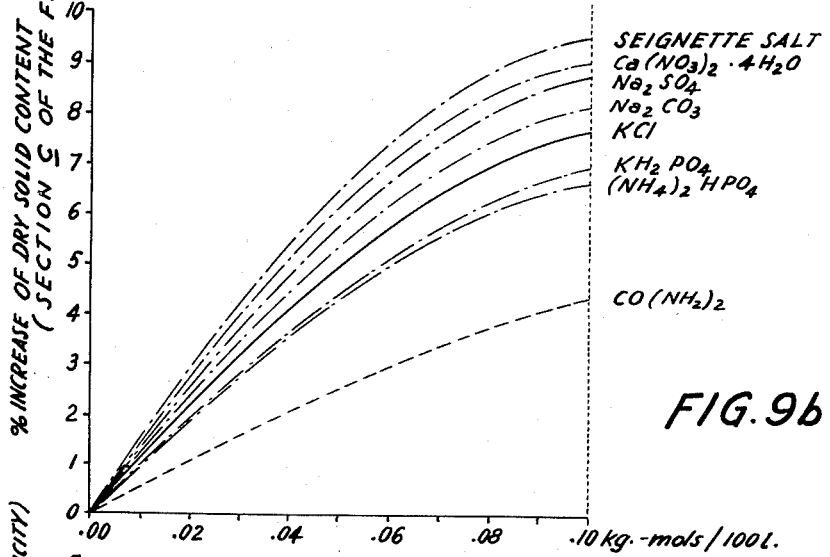
Figure 9C:
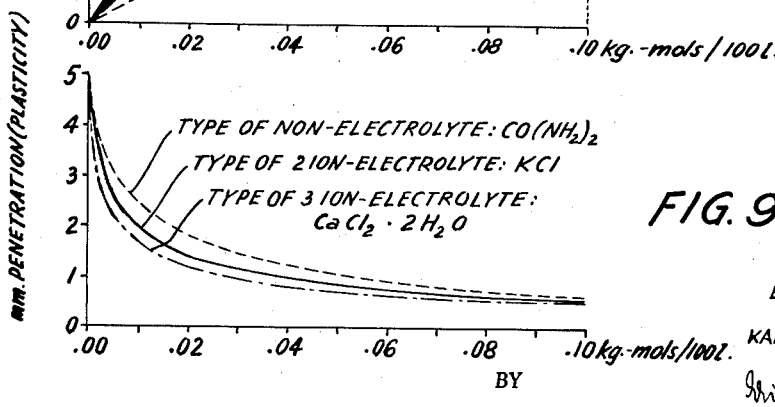

Of these figures, Fig. 8 illustrates the increase of dry solid matter in percent of the yeast taken from section A of the filter drum in relation to the added amount of osmotically active agent in kg.-moles per 100 l. of yeast cream. Figs. 9*a* and 9*b* illustrate the increase in dry solid content of the washed yeast taken from section C of the filter drum in relation to the added amount of osmotically active agent in kg.-moles per 100 l. of yeast cream and Fig. 9*c* illustrates the mm. penetration of the indentator into the washed yeast taken from section C of the filter drum, i.e., the plasticity changes in relation to the added amount of osmotically active agent in kg.-moles per 100 l. of yeast cream.

Figure 10:
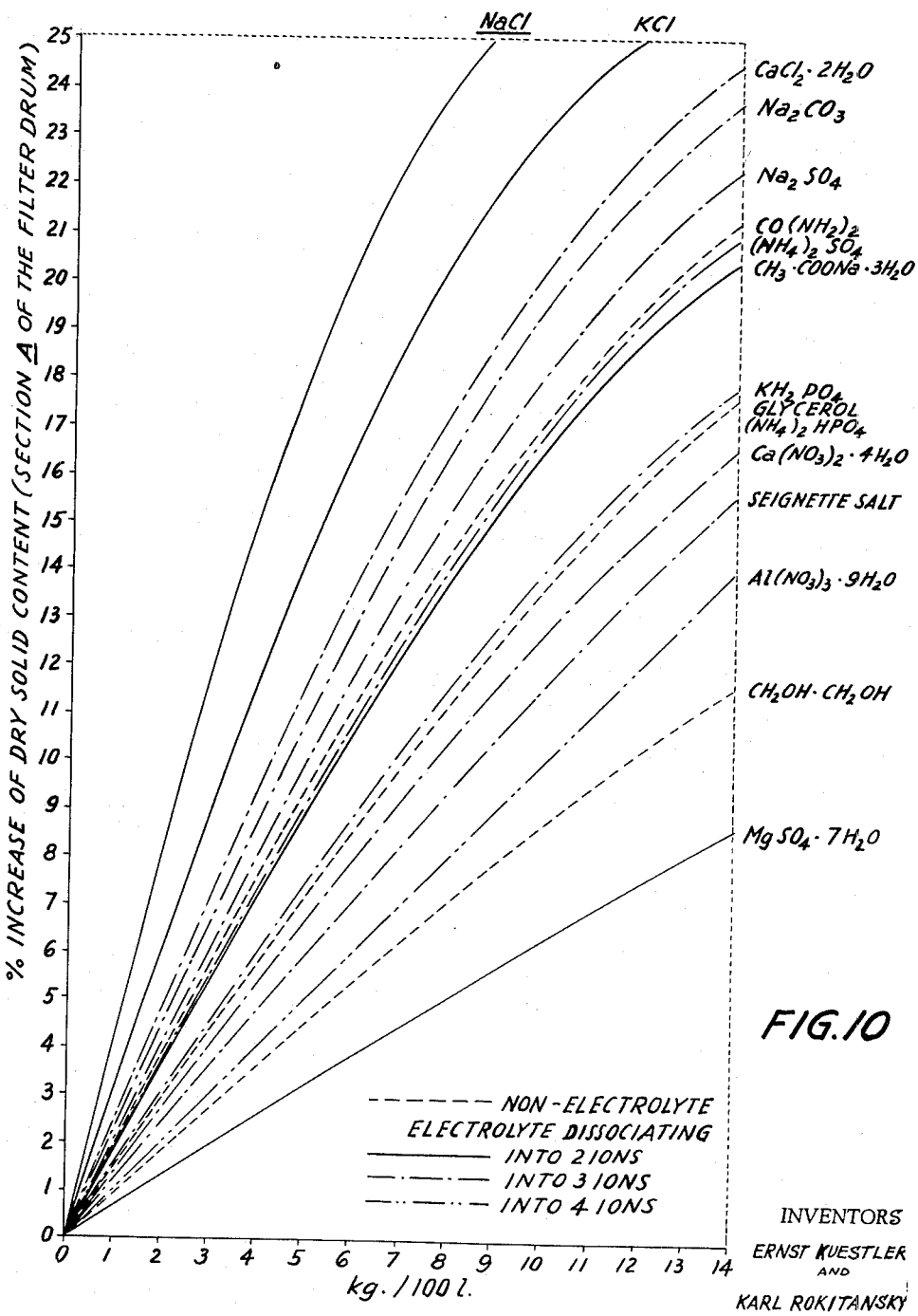

Fig. 10 illustrates the increase in dry solid content of yeast treated according to the present invention with various osmotically active agents. The dry solid content was determined in samples taken from section A of the filter drum, i.e., before the treated yeast is washed. These curves clearly show that sodium chloride has the highest efficacy.

To summarize, the new process according to the present invention consists in a very specific combination of steps and operations which, by their coaction, yield novel and unexpected results. These steps are as follows:

(1) First an osmotically highly active, water soluble compound and especially sodium chloride is added to the aqueous suspension of yeast, such as yeast cream. Thereby strong cytorrhysis takes place, i.e., the intracellular water exudes from the yeast cells and the cells undergo a reversible shrinkage process, i.e., they contract reversibly and their volume is reduced.

(2) The resulting cytorrhyzed cell suspension is filtered by suction, thereby forming a filter cake of cytorrhyzed yeast cells, i.e., of yeast of a lower intracellular water content than that of the cells of the initial yeast cream.

(3) Thereafter the filter cake of cytorrhyzed yeast cells is sprayed with an aqueous liquid of low osmotic activity and preferably with water while the filter cake is exposed to the vacuum of the suction filter. Thereby the extracellular liquid which consists of an aqueous solution of the osmotically active compound, i.e., of sodium chloride, is displaced by said water and the extracellular water content of the yeast layer is adjusted in accordance with the pressure difference of the suction filter. According to this characteristic feature of the present invention the displacement of the extracellular liquid of high osmotic pressure by water and the adjustment of the extracellular water content of the yeast in accordance with the pressure difference of the rotary filter must be completed before considerable amounts of said displacement water are reabsorbed by the cytorrhyzed yeast cells. Only when this time factor is carefully taken into account, it is possible to obtain the desired effect, namely, to increase the dry substance content of yeast and, at the same time, to decrease its plasticity.

(4) Finally, after substantially all the aqueous extracellular solution containing sodium chloride or any other osmotically active compounds has been replaced by water and the extracellular water content of the filter cake has been adjusted to a value corresponding to the pressure difference of the suction filter, suction filtration is continued whereby recytorrhysis, i.e., reabsorption of part of the extracellular water by the cells takes place so that the extracellular water content of the resulting filtered yeast is diminished while its intracellular water content is about the same as that of the yeast cells before this treatment.

As stated above, this procedure produces a filtered, by suction, yeast material of a low water content and, at the same time, a low plasticity in continuous operation on a filter drum and, thus, obviates all the heretofore encountered difficulties in suction filtration of yeast cream.

Of course, many changes and variations in the starting yeast cream, its water content and its origin, in the osmotically active agent and the amount thereof to be added to the yeast cream, in the time of exposure of the yeast cream to said osmotically active agent, in the thickness of the yeast filter cake, in the time of washing of the cytorrhyzed yeast with water, in the final filtration of the washed yeast, in the time allowed for recytorrhysis of the extracellular water, and the like may be made by those skilled in the art in accordance with the principles set forth herein and in the claims annexed hereto.

We claim:

1. In a process of producing yeast of increased dry solid content and reduced plasticity by means of suction filtration in continuous operation, the steps comprising adding to yeast cream between about 0.1 kg. and about 1.0 kg. of sodium chloride for each 100 l. of yeast cream, thereby causing exudation of intracellular water from and cytorrhysis of the yeast cells, subjecting the resulting cytorrhyzed yeast cream in a continuously moving layer to suction filtration, displacing directly after formation of said layer the sodium chloride-containing extracellular water present therein by water in an amount dependent upon the difference in pressure prevailing during said suction filtration, thereby exposing said layer to said displacing water for a period of time sufficient to complete such displacement reaction, but too short to cause complete reabsorption of displacing water by the cytorrhyzed yeast cells to replace all of the exuded intracellular water, and continuing exposing the thus treated and washed yeast layer to the action of the difference in pressure prevailing during said suction filtration, thereby causing the yeast cells to reabsorb extracellular water present outside of the cells of said yeast layer so as to decrease the extracellular water content thereof below the value corresponding to and attainable by said difference in pressure.

2. In a process of producing yeast of increased dry solid content and reduced plasticity according to claim 1, wherein the amount of sodium chloride added to the yeast cream to cause cytorrhysis is between about 0.3 kg. and about 0.6 kg. for each 100 l. of yeast cream.

3. In a process of producing yeast of an increased dry solid content and reduced plasticity by means of suction filtration in continuous operation, the steps comprising adding to yeast cream a readily water soluble, substantially non-toxic, colorless, and odorless osmotically active compound unreactive with the substances present in the extracellular water and with the yeast cell membrane, in an amount between about 0.001 kg.-moles and 0.2 kg.-moles for each 100 l. of yeast cream so as to cause exudation of intracellular water from and cytorrhysis of the yeast cells, subjecting the resulting cytorrhyzed yeast cream in a continuously moving layer to suction filtration, displacing, directly after formation of said layer, the aqueous extracellular liquid present in said layer by water in an amount dependent upon the difference in pressure prevailing during said suction filtration, thereby exposing said layer to said displacing water for a period of time sufficient to complete such displacement but too short to cause complete reabsorption of the displacing water by the cytorrhyzed yeast cells to replace all of the exuded intracellular water, and continuing exposing the thus treated and washed yeast layer to the action of the difference in pressure prevailing during said suction filtration, thereby causing the yeast cells to reabsorb extracellular water present outside of the cells of said yeast layer so as to decrease the extracellular water content thereof below the value corresponding to and attainable by said difference in pressure.

4. In a process of producing yeast of an increased dry solid content and reduced plasticity by means of suction filtration in continuous operation, the steps comprising adding to yeast cream a readily water soluble substantially non-toxic, colorless, and odorless osmotically active electrolyte selected from the group consisting of alkali metal, alkaline earth metal, ammonium, and aluminum salts, said electrolyte being unreactive with the substances present in the extracellular water and with the yeast cell membrane, in an amount between about 0.001 kg.-moles and 0.2 kg.-moles for each 100 l. of yeast cream so as to cause exudation of intracellular water from and cytorrhysis of the yeast cells, subjecting the resulting cytorrhyzed yeast cream in a continuously moving layer to suction filtration, displacing, directly after formation of said layer, the aqueous extracellular liquid present in said layer by water in an amount dependent upon the difference in pressure prevailing during said suction filtration, thereby exposing said layer to said displacing water for a period of time sufficient to complete such displacement but too short to cause complete reabsorption of the displacing water by the cytorrhyzed yeast cells to replace all of the exuded intracellular water, and continuing exposing the thus treated and washed yeast layer to the action of the difference in pressure prevailing during said suction filtration, thereby causing the yeast cells to reabsorb extracellular water present outside of the cells of said yeast layer so as to decrease the extracellular water content thereof below the value corresponding to and attainable by said difference in pressure.

5. In a process of producing yeast of an increased dry solid content and reduced plasticity by means of suction filtration in continuous operation, the steps comprising adding to yeast cream a readily water soluble substantially nontoxic, colorless, and odorless osmotically active non-electrolyte selected from the group consisting of mono- and polyhydric alcohols, carbohydrates non fermentable by said yeast, and urea, said non-electrolyte being unreactive with the substances present in the extracellular water and with the yeast cell membrane, in an amount between about 0.001 kg.-moles and 0.2 kg.-moles for each 100 l. of yeast cream so as to cause exudation of intracellular water from and cytorrhysis of the yeast cells, subjecting the resulting cytorrhyzed yeast cream in a continuously moving layer to suction filtration, displacing directly after formation of said layer, the aqueous extracellular liquid present in said layer by water in an amount dependent upon the difference in pressure prevailing during said suction filtration, thereby exposing said layer to said displacing water for a period of time sufficient to complete such displacement but too short to cause complete reabsorption of the displacing water by the cytorrhyzed yeast cells to replace all of the exuded intracellular water, and continuing exposing the thus treated and washed yeast layer to the action of the difference in pressure prevailing during said suction filtration, thereby causing the yeast cells to reabsorb extracellular water present outside of the cells of said yeast layer so as to decrease the extracellular water content thereof below the value corresponding to and attainable by said difference in pressure.

6. The process according to claim 3, wherein suction filtration is effected by means of a vacuum applied to a rotating filtering surface.

7. In a process of producing yeast of an increased dry solid content and reduced plasticity by means of suction filtration in continuous operation, the steps comprising adding to yeast cream a readily water soluble substantially non-toxic, colorless, and odorless osmotically active alkali metal chloride unreactive with the substances present in the extracellular water and with the yeast cell membrane in an amount between about 0.001 kg.-moles and 0.2 kg.-moles for each 100 l. of yeast cream so as to cause exudation of intracellular water from and cytorrhysis of the yeast cells, subjecting the resulting cytorrhyzed yeast cream in a continuously moving layer to suction filtration, displacing, directly after formation of said layer, the aqueous extracellular liquid present in said layer by water in an amount dependent upon the difference in pressure prevailing during said suction filtration, thereby exposing said layer to said displacing water for a period of time sufficient to complete such displacement but too short to cause complete reabsorption of the displacing water by the cytorrhyzed yeast cells to replace all of the exuded intracellular water, and continuing exposing the thus treated and washed yeast layer to the action of the difference in pressure prevailing during said suction filtration, thereby causing the yeast cells to reabsorb extracellular water present outside of the cells of said yeast layer so as to decrease the extracellular water content thereof below the value corresponding to and attainable by said difference in pressure.

8. In a process of producing yeast of an increased dry solid content and reduced plasticity by means of suction filtration in continuous operation, the steps comprising adding to yeast cream a readily water soluble substantially non-toxic, colorless, and odorless osmotically active alkali metal sulfate unreactive with the substances present in the extracellular water and with the yeast cell membrane in an amount between about 0.001 kg.-moles and 0.2 kg.-moles for each 100 l. of yeast cream so as to cause exudation of intracellular water from and cytorrhysis of the yeast cells, subjecting the resulting cytorrhyzed yeast cream in a continuously moving layer to suction filtration, displacing, directly after formation of said layer, the aqueous extracellular liquid present in said layer by water in an amount dependent upon the difference in pressure prevailing during said suction filtration, thereby exposing said layer to said displacing water for a period of time sufficient to complete such displacement but too short to cause complete reabsorption of the displacing water by the cytorrhyzed yeast cells to replace all of the exuded intracellular water, and continuing exposing the thus treated and washed yeast layer to the action of the difference in pressure prevailing during said suction filtration, thereby causing the yeast cells to reabsorb extracellular water present outside of the cells of said yeast layer so as to decrease the extracellular water content thereof below the value corresponding to and attainable by said difference in pressure.

9. In a process of producing yeast cell material with an increased dry solid content by means of suction filtration of suspensions of said cell material in continuous operation, the steps comprising adding to an aqueous suspension of said cell material a water soluble, osmotically active compound in an amount sufficient to cause exudation of intracellular water from and cytorrhysis of the cells of said material, subjecting the resulting cytorrhyzed cell suspension in a continuously moving layer to suction filtration, displacing, after formation of said layer, the aqueous extracellular liquid present in said layer in an amount dependent upon the difference in pressure prevailing during said suction filtration, said liquid containing the osmotically active compound, by an aqueous liquid of lower osmotic pressure in such a manner that said displacement reaction is completed before the total amount of water corresponding to the exuded amount of intracellular water is reabsorbed from said displacing liquid by said cytorrhyzed cell material, and continuing exposing the thus treated and washed layer of cell material to the action of the difference in pressure prevailing during said suction filtration, thereby causing said cell material to reabsorb extracellular water present outside of the cells of said cell material layer so as to decrease the extracellular water content thereof below the value corresponding to and attainable by said difference in pressure.

10. In a process of producing yeast cell material with an increased dry solid content according to claim 9, wherein a filtered yeast cell material of predetermined increased dry solid content and predetermined reduced plasticity is obtained by adding a predetermined amount of the osmotically active compound to the cell suspension.

11. In a process of producing yeast cell material with an increased dry solid content according to claim 9, wherein the osmotically active compound is sodium chloride and whereby between about 0.1 kg. and about 1.0 kg. of sodium chloride are added to 100 l. each of said cell suspension.

12. In a process of producing yeast cell material with an increased dry solid content according to claim 9, wherein suction filtration is effected by means of a vacuum applied to a rotating filtering surface.

13. In a process of producing yeast of increased dry solid content and reduced plasticity by means of suction filtration in continuous operation, the steps comprising adding to yeast cream sodium chloride in an amount sufficient to cause exudation of intracellular water from and cytorrhysis of the yeast cells, subjecting the resulting cytorrhyzed yeast cream in a continuously moving layer to suction filtration, displacing, by water, directly after formation of said layer, sodium chloride-containing extracellular water present in said yeast layer in an amount dependent upon the difference in pressure prevailing during said suction filtration, thereby exposing said layer to said displacing water for a period of time sufficient to complete such displacement reaction, but too short to cause complete reabsorption of displacing water by the cytorrhyzed yeast cells to replace all of said exuded intracellular water, and continuing exposing the thus treated and washed yeast layer to the action of the difference in pressure prevailing during said suction filtration, thereby causing the yeast cells to reabsorb extracellular water present outside of the cells of said yeast layer so as to decrease the extracellular water content thereof below the value corresponding to and attainable by said difference in pressure.

References Cited in the file of this patent

UNITED STATES PATENTS

| | | |
|---|---|---|
| 1,078,288 | Jacoby | Nov. 11, 1913 |
| 1,449,104 | Hayduck | Mar. 10, 1923 |
| 1,974,937 | White | Sept. 25, 1934 |
| 2,351,970 | Jansen | June 20, 1944 |